United States Patent [19]
Rumpf et al.

[11] Patent Number: 5,899,528
[45] Date of Patent: May 4, 1999

[54] VEHICLE SEAT WITH INTEGRATED LATERAL AIRBAG

[75] Inventors: Martin Rumpf, Kuala Lumpur, Malaysia; Dean Nightingale, Wilmington, United Kingdom

[73] Assignee: Autoliv Development AB, Vargarda, Sweden

[21] Appl. No.: 08/882,702

[22] Filed: Jun. 25, 1997

[30] Foreign Application Priority Data

Jun. 25, 1996 [DE] Germany ............................ 196 25 436

[51] Int. Cl.⁶ ................................ B60N 2/42; B60R 21/16
[52] U.S. Cl. .................................. 297/216.13; 280/730.2; 297/216.1; 297/217.1
[58] Field of Search ............................ 297/216.13, 216.1, 297/216.12, 217.1, 218.1, 218.3, 218.5; 280/730.2

[56] References Cited

U.S. PATENT DOCUMENTS

| | | | |
|---|---|---|---|
| 5,498,030 | 3/1996 | Hill et al. | 280/730.2 X |
| 5,553,887 | 9/1996 | Karlow et al. | 280/730.2 |
| 5,588,671 | 12/1996 | Boumarafi et al. | 280/730.2 |
| 5,601,332 | 2/1997 | Schultz et al. | 297/216.13 |
| 5,628,527 | 5/1997 | Olson et al. | 280/730.2 |
| 5,639,111 | 6/1997 | Spencer et al. | 280/730.2 X |
| 5,645,295 | 7/1997 | White, Jr. et al. | 280/730.2 |
| 5,651,582 | 7/1997 | Nakano | 297/216.13 |
| 5,678,853 | 10/1997 | Maly | 280/730.2 |
| 5,681,055 | 10/1997 | Green et al. | 280/730.2 X |
| 5,687,987 | 11/1997 | Spencer et al. | 280/730.2 X |
| 5,690,354 | 11/1997 | Logan et al. | 280/730.2 X |
| 5,700,028 | 12/1997 | Logan et al. | 280/730.2 X |

FOREIGN PATENT DOCUMENTS 296 01 257 U  4/1996  Germany.

*Primary Examiner*—Peter M. Cuomo
*Assistant Examiner*—Rodney B. White
*Attorney, Agent, or Firm*—Robert W. Becker & Associates

[57] ABSTRACT

A vehicle seat has a seat member and a back rest connected to the seat member. The seat member and the back rest have an upholstery cover. An airbag module is mounted within the back rest or the seat member. The airbag module has an airbag and a module cover for enclosing the airbag. The module cover has a rated break line for releasing the airbag upon activation of the airbag module. The upholstery cover has a slit with opposed longitudinal edges. The module cover is positioned such that the rated break line extends parallel to an adjacent to slit such that the airbag is able to pass through the upholstery cover after activation of the airbag module. The opposed longitudinal edges are fastened to the module cover on opposite sides of the rated break line.

14 Claims, 4 Drawing Sheets

VEHICLE SEAT WITH INTEGRATED LATERAL AIRBAG

BACKGROUND OF THE INVENTION

The present invention relates to a vehicle seat with an airbag module arranged in its interior and covered by an upholstery cover. The airbag module includes an airbag which upon actuation is inflated with the effective filling pressure and upon filling penetrates to the exterior through an opening within the upholstery cover of the vehicle seat whereby the airbag module at the exit side for the airbag comprises a cover that is provided with a rated break line.

A vehicle seat with an integrated lateral airbag with the aforementioned features is known from German Gebrauchsmuster 296 01 257. As disclosed in this prior art document, for such a lateral airbag there exists the problem that for the formation of the unfolding opening within the upholstery cover of the vehicle seat special measures must be taken at the exterior of the seat, especially at the exterior side of the upholstery cover. For this reason it is suggested in the cited prior art solution to provide a separating means within the vehicle seat which acts mechanically and is activated by the filling pressure during inflation of the airbag in order to thus produce the unfolding opening within the upholstery cover. This solution has the disadvantage that the additional means for separating requires additional expenditures with respect to manufacture and mounting, but also results in a weak point of the construction with respect to reliability because, when this separating means does not operate properly, a quick inflation of the airbag and penetration through the closed upholstery cover is questionable. Furthermore, injuries to the person to be protected within the seat as well as damage to the airbag can not be prevented.

It is therefore an object of the present invention to provide a vehicle seat of the aforementioned kind, including an unfolding opening within the upholstery cover that is easy to mount, is functionally reliable, and visually pleasing.

SUMMARY OF THE INVENTION

The vehicle seat according to the present invention is primarily characterized by:
  a seat member;
  a back rest connected to the seat member;
  the seat member and the back rest having an upholstery cover;
  an airbag module mounted within the back rest or the seat member;
  the airbag module comprising an airbag and a module cover for enclosing the airbag;
  the cover having a rated break line for releasing the airbag upon activation of the airbag module;
  the upholstery cover having a slit with opposed longitudinal edges;
  the module cover positioned such that the rated break line extends parallel to and adjacent to the slit such that the inflating airbag is able to pass through the upholstery cover after activation of the airbag module;
  the opposed longitudinal edges fastened to the module cover on opposite sides of the rated break line.

The vehicle seat further comprises fasteners connected to the module cover, wherein the opposed longitudinal edges are fastened to the module cover by the fasteners.

The opposed longitudinal edges are clamped by the fasteners.

The fasteners have clamping zones including a wavy surface for clamping the opposed longitudinal edges.

The fasteners comprise a moveable clamping bar for clamping the opposed longitudinal edges.

The fasteners comprise first and second interlocking members positioned in a plane of the upholstery cover for closing the slit. The interlocking members disengage upon activation of the airbag module.

The fasteners have an outer side covered by the upholstery cover.

The fasteners are preferably attached to the module cover by a snap connection, a velcro connection, or by an adhesive.

The vehicle seat according to another embodiment preferably comprises fasteners connected to the module cover wherein the opposed longitudinal edges include strips that are folded over inwardly and are facing the module cover and wherein the strips are connected to the fasteners.

The fasteners are attached to the module cover by a snap connection, a velcro connection or by an adhesive.

Expediently, the slit is longer than the airbag module in a longitudinal direction of the slit.

The present invention is based on the principle that the upholstery cover is provided with a slit that extends along the rated break line of the module cover of the airbag module and that the edges of the upholstery module cover extending in the longitudinal direction along the slit are fastened on both sides of the rated break line to the module cover of the airbag module. The invention has the advantage that the unfolding opening for releasing the airbag through the upholstery cover is in the form of a slit provided within the upholstery cover. Such a slit must be provided in any case, but according to the invention must not be opened in a special manner. Since the edges of the slit are connected to the module cover of the airbag module, respectively, at separate parts of the module cover on either side of the rated break line, upon rupture of the rated break line the edges of the slit within the upholstery cover fold away together with the parts of the module cover so that an unhindered unfolding of the airbag through the opening is possible. The function of the rated break line within the module cover is not impeded by any external factors such as an additional means for separating the upholstery cover.

The suggested solution is advantageous in regard to mounting because the provided slit allows mounting of the airbag module within the vehicle seat, whereby subsequently the upholstery cover, since it is then to attached to the airbag module, can be closed and only a separating line of the slit remains visible. Since the longitudinal edges of the slit are fastened to the airbag module, the unfolding opening slit within the upholstery cover is thus held together so that the slit area of the upholstery cover does not impede the appearance or function of the seat.

According to one embodiment of the invention, it is suggested that the edges of the upholstery cover are secured in fasteners and that the fasteners are connected to the module cover of the airbag module. The edges of the upholstery cover can be clamped by the fasteners.

For providing such a clamping action, the clamping zones of the fasteners can have a wavy surface for clamping the upholstery cover therebetween. Alternatively, the fasteners comprise a movable clamping bar for clamping the upholstery cover.

In order to be able to make the slit within the upholstery cover even less visible, according to one embodiment of the invention fasteners for closing the slit within the upholstery cover are positioned in the plane of the upholstery cover.

They have an interlocking connection with interlocking members that upon unfolding of the airbag will become separated, i.e, the interlocking connection is released. A further improvement of the visual appearance can be achieved by covering the fasteners at their outer side with the upholstery cover material (fabric, leather etc).

In an alternative embodiment of the invention the edges of the upholstery cover are folded inwardly and the folded strip thereof that is facing the airbag module is fastened to fasteners which, in turn, are fastened to the module cover of the airbag module.

The connection between the fasteners and the module cover, needed for realizing the present invention, can be in the form of a snap connection in any suitable embodiment known in the prior art. The portion of the snap connection correlated with the airbag module may be integrated into the module cover of the airbag module. However, other types of connection may be used such as velcro closures or a connection using an adhesive.

According to the present invention the mounting of the airbag module as well as the unfolding of the airbag are facilitated in that the slit provided within the upholstery cover has a greater extension (length) in its longitudinal direction than the airbag module.

BRIEF DESCRIPTION OF THE DRAWINGS

The object and advantage of the present invention will appear more clearly from the following specification in conjunction with the accompanying drawings, in which:

FIG. 2 shows the unfolding opening within the upholstery cover and the airbag module in section;

FIG. 3 shows the object of FIG. 2 in another embodiment;

DESCRIPTION OF PREFERRED EMBODIMENTS

The present invention will now be described in detail with the aid of several specific embodiments utilizing FIGS. 1 through 3.

Figure 1:
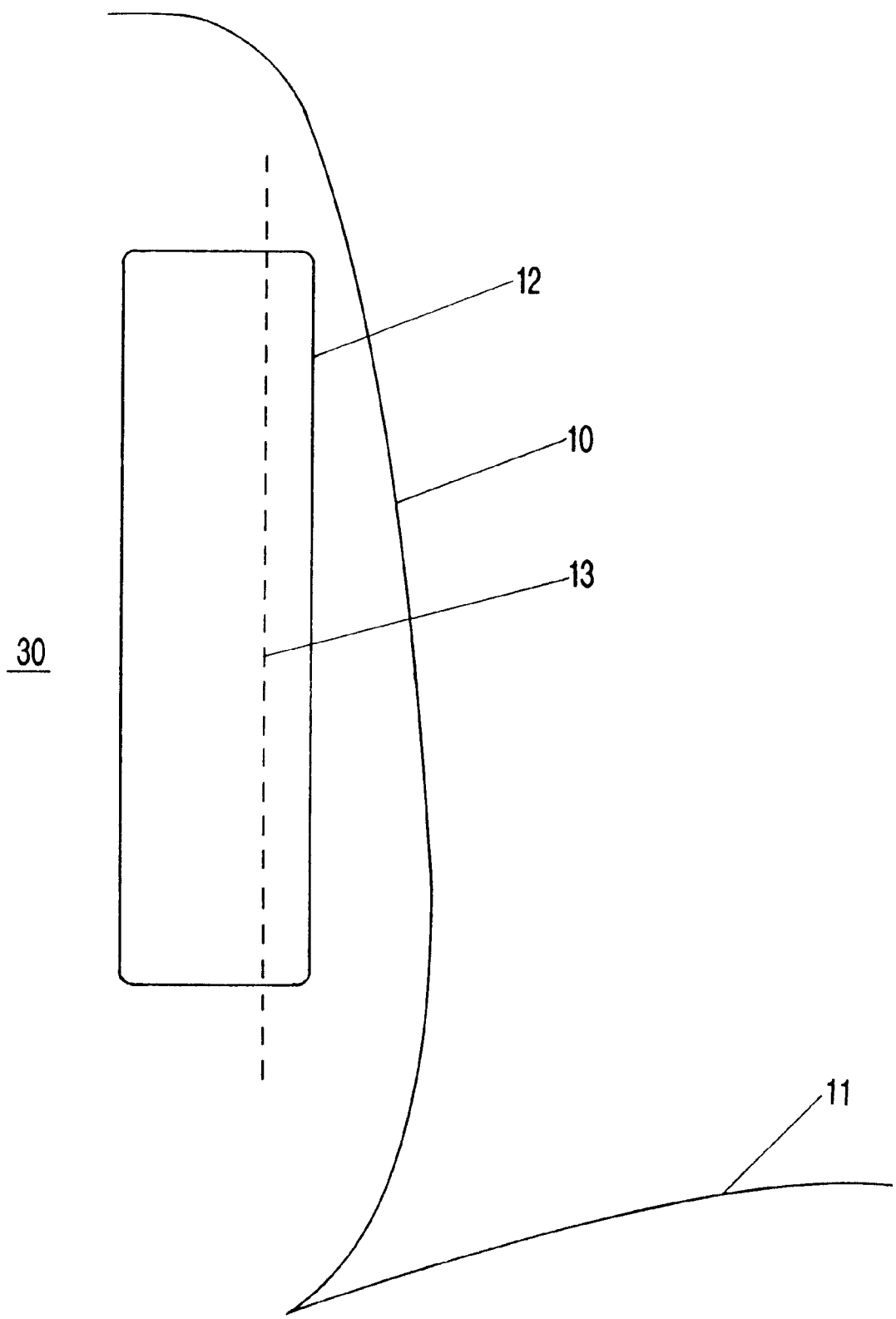
FIG. 1 is a schematic side view of a vehicle seat with integrated airbag module.
Figure 2A:
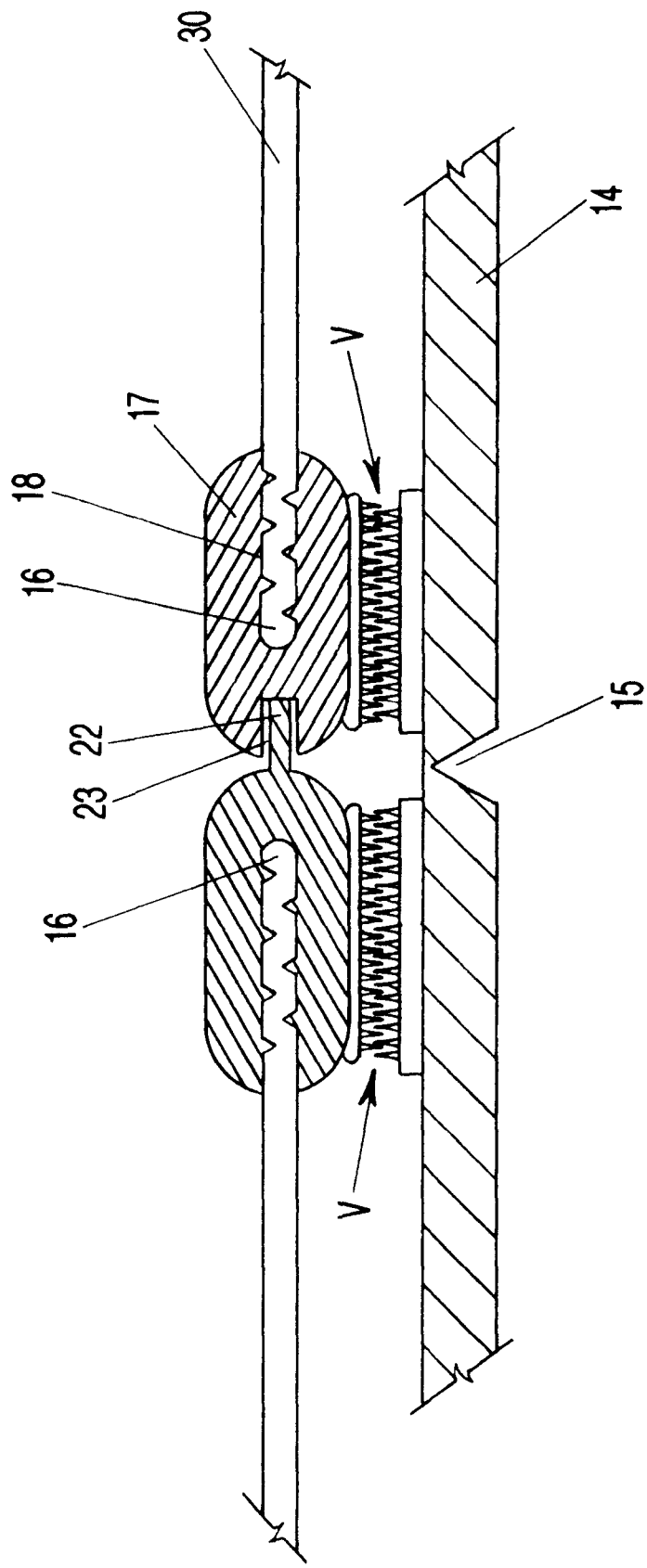
FIG. 2a shows the fasteners attached to the module cover by a VELCRO connection.

The vehicle seat represented schematically in FIG. 1 has a back rest 10 and a seat member indicated at 11. An airbag module 12 is integrated into the back rest 10 which is covered by an upholstery cover indicated by reference numeral 30. The mounting and unfolding opening is a slit 13, indicated by a dashed line, within the upholstery cover 30.

As can be seen in detail in FIG. 2, the airbag module 12 includes a module cover 14 which has a rated break line 15 extending along the slit 13 of the upholstery cover 30 (FIG. 1). In the embodiment represented in FIG. 2 the edges 16 extending along the slit 13 are clamped in fasteners 17. The fasteners 17 have a clamping zone in the form of a wavy surface 18 receiving the edges 16 of the slit 13. The fasteners 17 holding the two longitudinal edges 16 are connected with snap connection 19 to the module cover 14. The snap connection 19 is comprised of a groove 20, provided at the cover 14 on the end face that is facing the fasteners and having an undercut, and a projection 21 of a matching shape connected to the fasteners 17.

For improving closing of the slit 13, the fasteners 17 in the plane of the upholstery cover 30 are provided with an additional groove 22 and a projection 23 engaging the groove 22.

When in this embodiment the airbag is inflated, the rated break line 15 within the module cover 14 will rupture. The thus formed separate parts of the module cover 14 will pivot upwardly and outwardly (directions given relative to FIG. 2). Since the fasteners 17, which secure the opposed longitudinal edges 16 of the upholstery cover 30, are secured to the respective parts of the module cover 14 which fold away, the fasteners 17 thus also will be pivoted away from the unfolding opening (slit 13) in order to release the airbag.

Figure 2B:
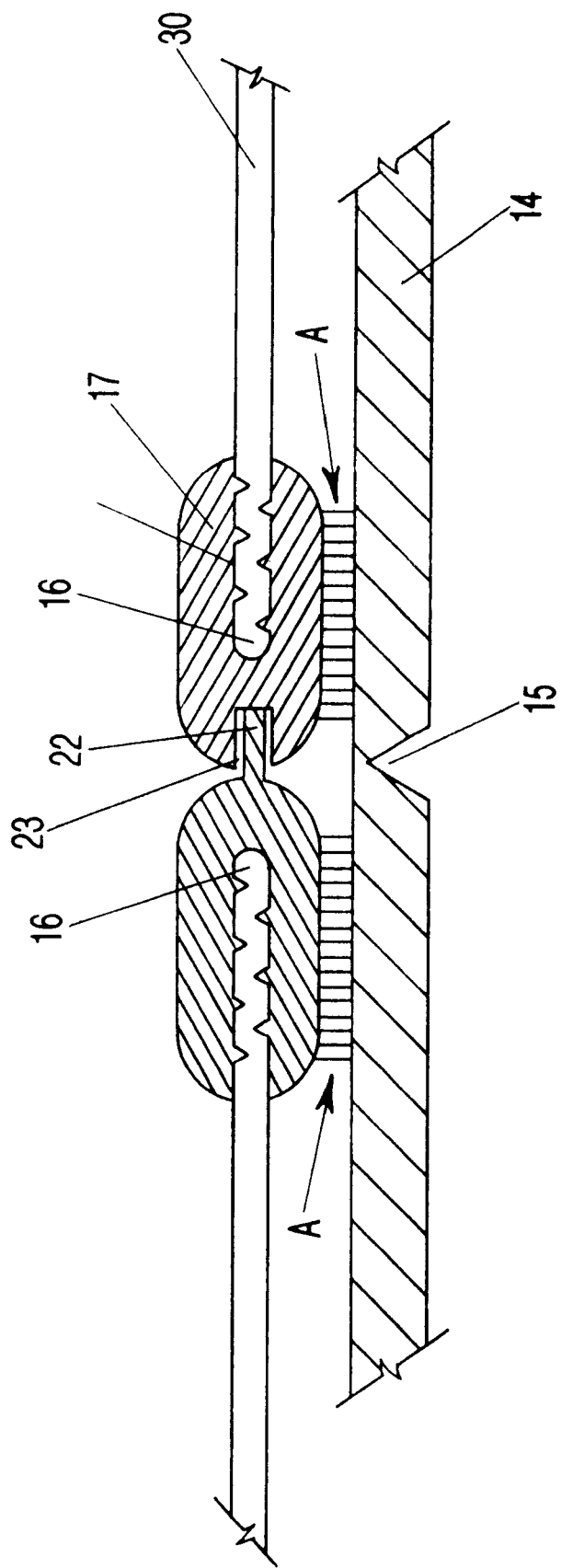
FIG. 2b shows the fasteners attached to the module cover by an adhesive.
Figure 3A:
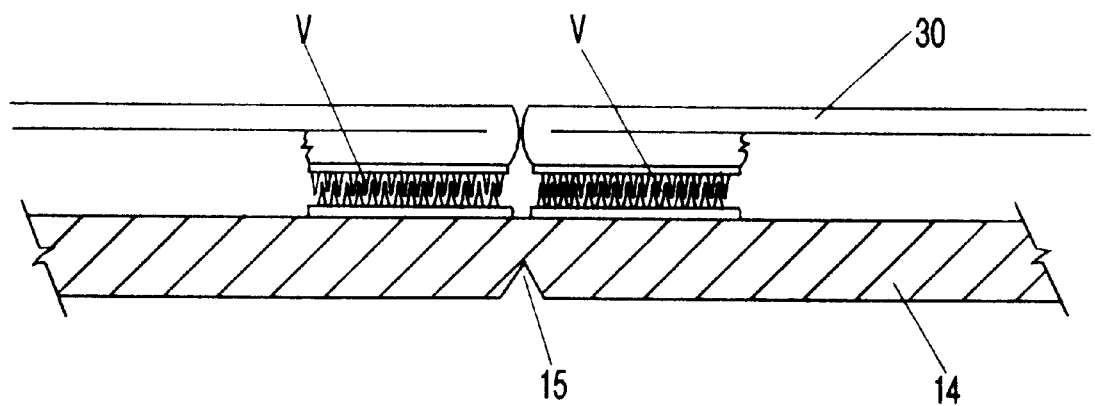
FIG. 3a shows the folded fabric attached to the module cover by a VELCRO connection.

The fasteners 17 may be attached to the module cover 14 by a VELCRO connection V (see FIG. 2a) or an adhesive A (see FIG. 2b).

FIG. 3 shows another embodiment of the invention in which the two edges 16 of the upholstery cover 30 are folded inwardly so that strips 24 adjacent to the airbag module 12, respectively, its module cover 14 are formed. At the side of the strips 24 facing the module cover 14, the fasteners 25 are provided. The folded strips 24 of the upholstery cover 30 are secured by stitches 26 (seam) to the fasteners 25, whereby the fasteners 25, in the same manner as disclosed in connection with FIG. 2, have a snap connection 19 including groove 20 and projection 21.

Figure 3B:
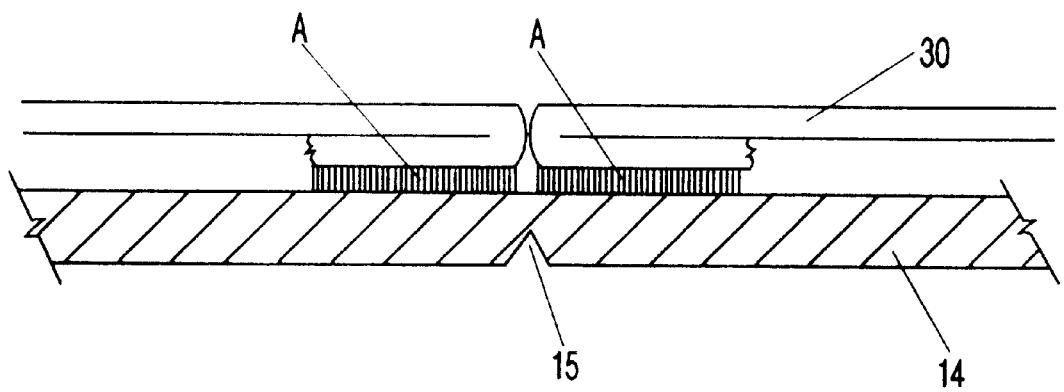
FIG. 3b shows the folded fabric attached to the module cover by an adhesive.

The folded fabric 30 may be attached to the module cover 14 by a VELCRO connection V (see FIG. 3a) or an adhesive A (see FIG. 3b).

The present invention is, of course, in no way restricted to the specific disclosure of the specification and drawings, but also encompasses any modifications within the scope of the appended claims.

What we claim is:

1. A vehicle seat comprising:

a seat member;

a back rest connected to said seat member;

said seat member and said back rest having an upholstery cover;

an airbag module mounted within said back rest or said seat member;

said airbag module comprising an airbag and a module cover for enclosing said airbag;

said module cover having a rated break line for releasing said airbag upon activation of said airbag module;

said upholstery cover having a slit with opposed longitudinal edges;

said module cover positioned such that said rated break line extends parallel to and adjacent to said slit such that said airbag is able to pass through said upholstery cover after activation of said airbag module;

said opposed longitudinal edges fastened to said module cover on opposite sides of said rated break line.

2. A vehicle seat according to claim 1, further comprising fasteners connected to said module cover, wherein said opposed longitudinal edges are fastened to said module cover by said fasteners.

3. A vehicle seat according to claim 2, wherein said opposed longitudinal edges are clamped by said fasteners.

4. A vehicle seat according to claim 3, wherein said fasteners have clamping zones including a wavy surface for clamping said opposed longitudinal edges.

5. A vehicle seat according to claim 2, wherein said fasteners comprise first and second interlocking members positioned in a plane of said upholstery cover for closing said slit, wherein said interlocking members disengage upon activation of said airbag module.

6. A vehicle seat according to claim 2, wherein said fasteners have an outer side covered by said upholstery cover.

7. A vehicle seat according to claim 2, wherein said fasteners are attached to said module cover by a snap connection.

8. A vehicle seat according to claim 2, wherein said fasteners are attached to said module cover by a velcro connection.

9. A vehicle seat according to claim 2, wherein said fasteners are connected to said module cover by an adhesive.

10. A vehicle seat according to claim 1, further comprising fasteners connected to said module cover, wherein said opposed longitudinal edges include strips that are folded over inwardly and are facing said module cover, wherein said strips are connected to said fasteners.

11. A vehicle seat according to claim 10, wherein said fasteners are attached to said module cover by a snap connection.

12. A vehicle seat according to claim 10, wherein said fasteners are attached to said module cover by a velcro connection.

13. A vehicle seat according to claim 10, wherein said fasteners are connected to said module cover by an adhesive.

14. A vehicle seat according to claim 1, wherein said slit is longer than said airbag module in a longitudinal direction of said slit.

* * * * *